(12) United States Patent
Edwards

(10) Patent No.: US 8,462,984 B2
(45) Date of Patent: Jun. 11, 2013

(54) DATA PATTERN RECOGNITION AND SEPARATION ENGINE

(75) Inventor: Tyson LaVar Edwards, Harrisville, UT (US)

(73) Assignee: Cypher, LLC, South Jordan, UT (US)

( * ) Notice: Subject to any disclaimer, the term of this patent is extended or adjusted under 35 U.S.C. 154(b) by 165 days.

(21) Appl. No.: 13/039,554

(22) Filed: Mar. 3, 2011

(65) Prior Publication Data

US 2012/0224741 A1    Sep. 6, 2012

(51) Int. Cl.
*G06K 9/00*    (2006.01)
*G06E 1/00*    (2006.01)

(52) U.S. Cl.
USPC ............................................. 382/100; 706/20

(58) Field of Classification Search
USPC ................. 382/100, 116, 124, 126, 159, 164, 382/165, 170, 171, 173, 179, 181, 184; 283/68, 283/78; 704/256.4; 705/7.33
See application file for complete search history.

(56) References Cited

U.S. PATENT DOCUMENTS

| | | | | |
|---|---|---|---|---|
| 5,675,705 | A | * | 10/1997 | Singhal ........................ 704/254 |
| 6,115,684 | A | * | 9/2000 | Kawahara et al. ............ 704/203 |
| 8,094,872 | B1 | * | 1/2012 | Yagnik et al. ................. 382/100 |
| 2002/0128834 | A1 | | 9/2002 | Fain et al. |
| 2005/0015258 | A1 | | 1/2005 | Somani et al. |
| 2006/0155399 | A1 | * | 7/2006 | Ward .............................. 700/94 |
| 2006/0210157 | A1 | | 9/2006 | Agnihotri et al. |
| 2007/0071206 | A1 | | 3/2007 | Gainsboro et al. |
| 2009/0216535 | A1 | | 8/2009 | Entlis et al. |
| 2009/0306932 | A1 | | 12/2009 | Li et al. |

OTHER PUBLICATIONS

United States Patent and Trademark Office as International Searching Authority "International Search Report and Written Opinion" issued Jun. 6, 2012 in related PCT application No. PCT/US2012/027626.
United States Patent and Trademark Office as International Searching Authority, "International Search Report and Written Opinion" issued Jun. 20, 2012 in related PCT application No. PCT/US2012/027638.

* cited by examiner

*Primary Examiner* — Abolfazl Tabatabai
(74) *Attorney, Agent, or Firm* — Durham Jones & Pinegar, P.C. Intellectual Property Law Group

(57) ABSTRACT

Embodiments disclosed herein extend to methods, systems, and computer program products for analyzing digital data. A source of digital data is analyzed and separated into segments, each segment having an identifiable characteristic. The separated segments are copied into planes of a higher dimension. The separated segments are compared to determine a resemblance factor. A fingerprint is generated for segments having a resemblance factor above a particular threshold. Based upon the generated fingerprint, a data source may be filtered to block or to pass data corresponding to the generated fingerprint. The digital data may be audio data, video data, or other data.

20 Claims, 10 Drawing Sheets

|   | 1 | 2 | 3 | 4 | 5 | 6 | 7 | 8 | 9 | ... | N |
|---|---|---|---|---|---|---|---|---|---|---|---|
| 1 | 100 | 50 | 1 | 95 | 20 | 33 | | | | | |
| 2 | 50 | 100 | 25 | 50 | 96 | 97 | | | | | |
| 3 | 1 | 25 | 100 | 75 | 60 | 5 | | | | | |
| 4 | 95 | 50 | 75 | 100 | 70 | 9 | 78 | | | | |
| 5 | 20 | 96 | 60 | 70 | 100 | 98 | | | | | |
| 6 | 33 | 97 | 5 | 9 | 98 | 100 | | | | | |
| 7 | | | | 78 | | | 100 | | | | |
| 8 | | | | | | | | 100 | | | |
| 9 | | | | | | | | | 100 | | |
| ... | | | | | | | | | | ... | |
| N | | | | | | | | | | | 100 |

Resemblance (Like) Values
Comparing Window Fingerprints

*Fig.5*

DATA PATTERN RECOGNITION AND SEPARATION ENGINE

CROSS-REFERENCE TO RELATED APPLICATIONS

N/A

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer various forms of data. The data used, manipulated, and transferred by systems and devices may be digital electronic data, may be analog data, may be a digital representation of analog data, or any number of other forms of data. Accordingly, the performance of many computing tasks are distributed across a number of different computer systems and/or a number of different computing environments.

Computer systems are now ubiquitous in music, sound, video, and other digital data applications. Digital computers are used as sound equalizers and in myriad other capacities in the digital storage and manipulation of data (which often represents underlying analog data). In using present technology, data is often lost in cleanup, processing, or manipulation of digital data which represents, for example, sound or video. Further, it is very often difficult to isolate particular parts of digital data (such as sound or video) in order to playback that particular part, removing other extraneous information, or to remove that particular part to produce a subset of the data without that particular part (such as, for example, removing a particular person's voice from an audio track or removing background freeway noise from a cell phone conversation).

Much in the audio world is focused around analyzer, equalizer, and phase technology (e.g., test, cleanup, etc.). There is a need for a mechanism for identifying patterns within an audio source and there is a need for tools which can analyze digital data to isolate particular patterns in order to apply desirable masks and/or filters to digital data.

BRIEF SUMMARY

The present invention extends to methods, systems, and computer program products for analyzing digital data. The digital data analyzed may be, for example, in the form of digital audio files, digital video files, real time audio streams, real time video streams, and the like. The present invention identifies patterns in a source of digital data and uses the identified patterns to analyze, classify, and filter the digital data.

Embodiments of the present invention extend to methods for analyzing digital data for determining related portions within the digital data. Of course, the digital data may be the digital representation of live or recorded analog data such as audio, video, etc. Such methods may be performed in a computer system which includes one or more computer processors and digital data storage. Such methods may include accessing a source of digital data where the digital data comprises at least two dimensions, a time dimension and a data value dimension.

Methods may also include determining a plurality of segments within the digital data where each segment is identified by some common characteristic of the segments. Methods may also include separating out and storing or representing each of the segments in an additional dimension, such as a third or possibly a fourth (or higher) dimension. When each of the segments (or some subset of the segments) is represented in an additional dimension, a resemblance value for each pair of the segments may be determined. Once a resemblance value is determined for each pair of segments, one or more three-dimensional (3D) fingerprints may be generated for each set of segments which share a resemblance value above some determined threshold.

Embodiments of the present invention also extend to methods for filtering and/or masking digital data. Such filtering methods may be performed within a computer system including one or more computer processors and digital data storage. Such filtering methods may include accessing a source of digital data, accessing a fingerprint of one or more segments of the digital data, and filtering and/or masking the digital data using the accessed fingerprint.

Embodiments of the present invention may also extend to computer program products for analyzing digital data. Such computer program products may be intended for executing computer-executable instructions upon computer processors in order to perform methods for analyzing digital data. Such computer program products may comprise computer-readable media which have computer-executable instructions encoded thereon wherein the computer-executable instructions, when executed upon suitable processors within suitable computer environments, perform methods of analyzing digital data as further described herein.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates an example matrix comprising resemblance values for individual segments of a digital data file.

DETAILED DESCRIPTION

Figure 1:
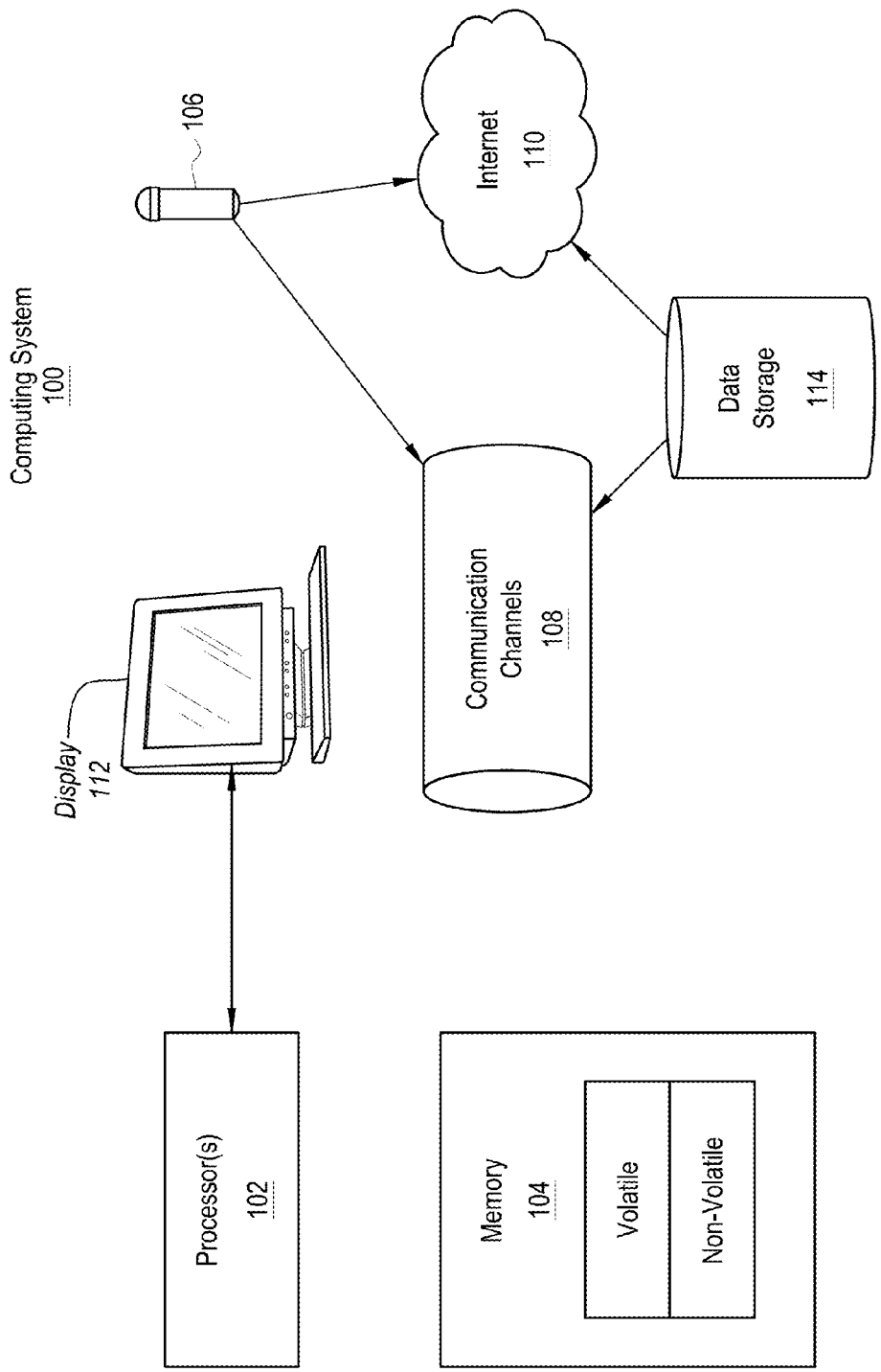
FIG. 1 illustrates an example computer architecture that facilitates the analysis of digital data described herein.

The present invention extends to methods, systems, and computer program products for analyzing digital data. The digital data analyzed may be, for example, in the form of digital audio files, digital video files, real time audio streams, real time video streams, and the like. The present invention identifies patterns in a source of digital data and uses the identified patterns to analyze, classify, and filter the digital data.

Particular embodiments of the present invention relate to digital audio. Embodiments are designed to perform non-destructive audio isolation and separation from any audio source based on the premise of pattern recognition. By identifying like and not like characteristics, embodiments of the present invention can separate an audio source into simple elements such as notes, progressions, syllables, and various types of either or both desirable characteristics or undesirable characteristics (e.g., "noise"). With separated like (and not like) segments, segments may then be re-joined into an audio track for further processing or may be kept separate as distinct elements which can be independently used, manipulated, and/or reassembled.

By implementing a look back buffer, operations within embodiments of the present invention are able to operate non-destructively. Embodiments analyze digital content retroactively to identify patterns and perform operations. This allows embodiments of the invention to work backwards through a digital data sample (e.g., an audio file) from the most dominant samples to the least dominant samples. Application of embodiments of the present invention enable identifying a sample within an audio file and selectively isolating the sample to its own track.

Embodiments of the present invention extend to methods for analyzing digital data for determining related portions within the digital data. Of course, the digital data may be the digital representation of live or recorded analog data such as audio, video, etc. Such methods may be performed in a computer system which includes one or more computer processors and digital data storage. Such methods may include accessing a source of digital data where the digital data comprises at least two dimensions, a time dimension and a data value dimension.

Methods may also include determining a plurality of segments within the digital data where each segment is identified by some common characteristic of the segments. Methods may also include separating out and storing or representing each of the segments in an additional dimension, such as a third or possibly a fourth (or higher) dimension. When each of the segments (or some subset of the segments) is represented in an additional dimension, a resemblance value for each pair of the segments may be determined. Once a resemblance value is determined for each pair of segments, one or more three-dimensional (3D) fingerprints may be generated for each set of segments which share a resemblance value above some determined threshold.

Embodiments of the present invention also extend to methods for filtering and/or masking digital data. Such filtering methods may be performed within a computer system including one or more computer processors and digital data storage. Such filtering methods may include accessing a source of digital data, accessing a fingerprint of one or more segments of the digital data, and filtering and/or masking the digital data using the accessed fingerprint.

Embodiments of the present invention may also extend to computer program products for analyzing digital data. Such computer program products may be intended for executing computer-executable instructions upon computer processors in order to perform methods for analyzing digital data. Such computer program products may comprise computer-readable media which have computer-executable instructions encoded thereon wherein the computer-executable instructions, when executed upon suitable processors within suitable computer environments, perform methods of analyzing digital data as further described herein.

Embodiments of the present invention may comprise or utilize a special purpose or general-purpose computer including computer hardware, such as, for example, one or more computer processors and data storage or system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other physical medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transmit desired program code means in the form of computer-executable instructions and/or data structures which can be received or accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or possibly primarily) make use of transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries which may be executed directly upon a processor, intermediate format instructions such as assembly language, or even higher level source code which may require compilation by a compiler targeted toward a particular machine or processor. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates analyzing digital data. Computer architecture 100 is also referred to herein as a computer system 100. Referring to FIG. 1, computer architecture 100 includes one or more computer processors 102 and data storage. Data storage may be memory 104 within the computing system 100 and may be volatile or non-volatile memory. Computing system 100 may also comprise a display 112 for display of data or other information.

Computing system 100 may also contain communication channels 108 that allow the computing system 100 to communicate with other computing systems, devices, or data sources over, for example, a network (such as perhaps the internet 110). Computing system 100 may also comprise an input device, such as microphone 106, which allows a source of digital or analog data to be accessed. Such digital or analog data may, for example, be audio or video data. Digital or analog data may be in the form of real time streaming data, such as from a live microphone, or may be stored data accessed from data storage 114 which is accessible directly by the computing system 100 or may be more remotely accessed through communication channels 108 or via a network such as the Internet 110.

Communication channels 108 are examples of transmission media. Transmission media typically embody computer-readable instructions, data structures, program modules, or other data in a modulated data signal such as a carrier wave or other transport mechanism and include any information-delivery media. By way of example, and not limitation, transmission media include wired media, such as wired networks and direct-wired connections, and wireless media such as acoustic, radio, infrared, and other wireless media. The term "computer-readable media" as used herein includes both computer storage media and transmission media.

Embodiments within the scope of the present invention also include computer-readable media for carrying or having computer-executable instructions or data structures stored thereon. Such physical computer-readable media, termed "computer storage media," can be any available physical media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other physical medium which can be used to store desired program code means in the form of computer-executable instructions or data structures and which can be accessed by a general purpose or special purpose computer.

Computer systems may be connected to one another over (or is part of) a network, such as, for example, a Local Area Network ("LAN"), a Wide Area Network ("WAN"), a Wireless Wide Area Network ("WWAN"), and even the Internet 110. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

FIGS. 2A-E illustrate a work flow chart of an example method comprising various steps and acts for analyzing digital data. The method of FIGS 2A-E will be described with respect to the components and data of computer architecture 100.

A method for analyzing digital data may include an act 202 of accessing a source of digital data. The digital data may comprise at least two dimensions, a time dimension and a data value dimension. For example, a source of digital data may be an audio file. Such an audio file may comprise a time dimension and a data value dimension. The time dimension may provide data which identifies at which time in the file a particular sound occurs. The data value dimension may provide the value of a frequency and value of an amplitude for the sound associated with the time of the time dimension.

The source of data may also be a streaming audio file arising from a live source, such as from an input microphone or from an archived digital source such as a .wav or .mpg, etc., file.

As those with skill in the art may recognize, a particular sound at a particular time may comprise a great many frequencies and associated amplitudes which combine in order to provide the rich and complex sounds typically associated with digital audio files. Of course, as one may appreciate, a digital file may be a previously stored file, a representation of a real-time analog source, or possibly some other source. Accordingly, although sometimes described in simpler terms, the description herein should be interpreted to include multiple data values associated with particular time values and nothing within the description should be interpreted as limiting the invention to single data values associated with time values within a source of digital data.

Methods may also include determining a plurality of segments within the digital data where each segment is identified by some common characteristic of the segments. Similarities may be found within segments of a source of digital data.

Window detection may be based on detecting the start and the end of a single note, a frequency progression, or a continuous data segment within the digital data. The digital data may be thusly segmented into windows where each window (or segment) comprises a time slice of the digital data where all the data within the time slice shares some common characteristic or similarity such as being part of the single note, frequency progression, or continuous data segment.

For example, a portion of an audio file may contain the sound of the strains of a particular violin or of a particular person's voice. The characteristics which identify the violin or voice may be more complex than simply frequency and/or amplitude. For example, a middle C played upon the particular violin may sound completely distinct from a middle C sung by the particular voice. For example, a middle C on a Violin compared to a middle C on a Clarinet will have distinct visual characteristics shown within a spectrum analyzer as well as determined within the embodiments herein. Such distinctions are distinct in terms of vibrato, hum, resonance and harmonic intensities, for example.

The portion of the audio file which contains the characteristics of the particular violin may be marked by a beginning time and by an ending time in order to identify that portion as a particular segment or window. Such similarities and/or characteristics may be found and used to identify a plurality of segments or windows within the digital data source. For example, a spectrum analyzer may be used to identify a plurality of windows within a digital audio file such that the entire digital audio file is segmented into a plurality of windows or segments, the data (e.g., sound) within each window having a common characteristic which may be used to identify the beginning time and ending time of the window. For example, the window start to window end may be identified based upon a single note or a continuous frequency progression. For example, a single note which beings at time 10 ms in a digital audio file and ends at time 15 ms may be used to identify a window beginning at 10 ms and ending at 15 ms.

Figure 2A:
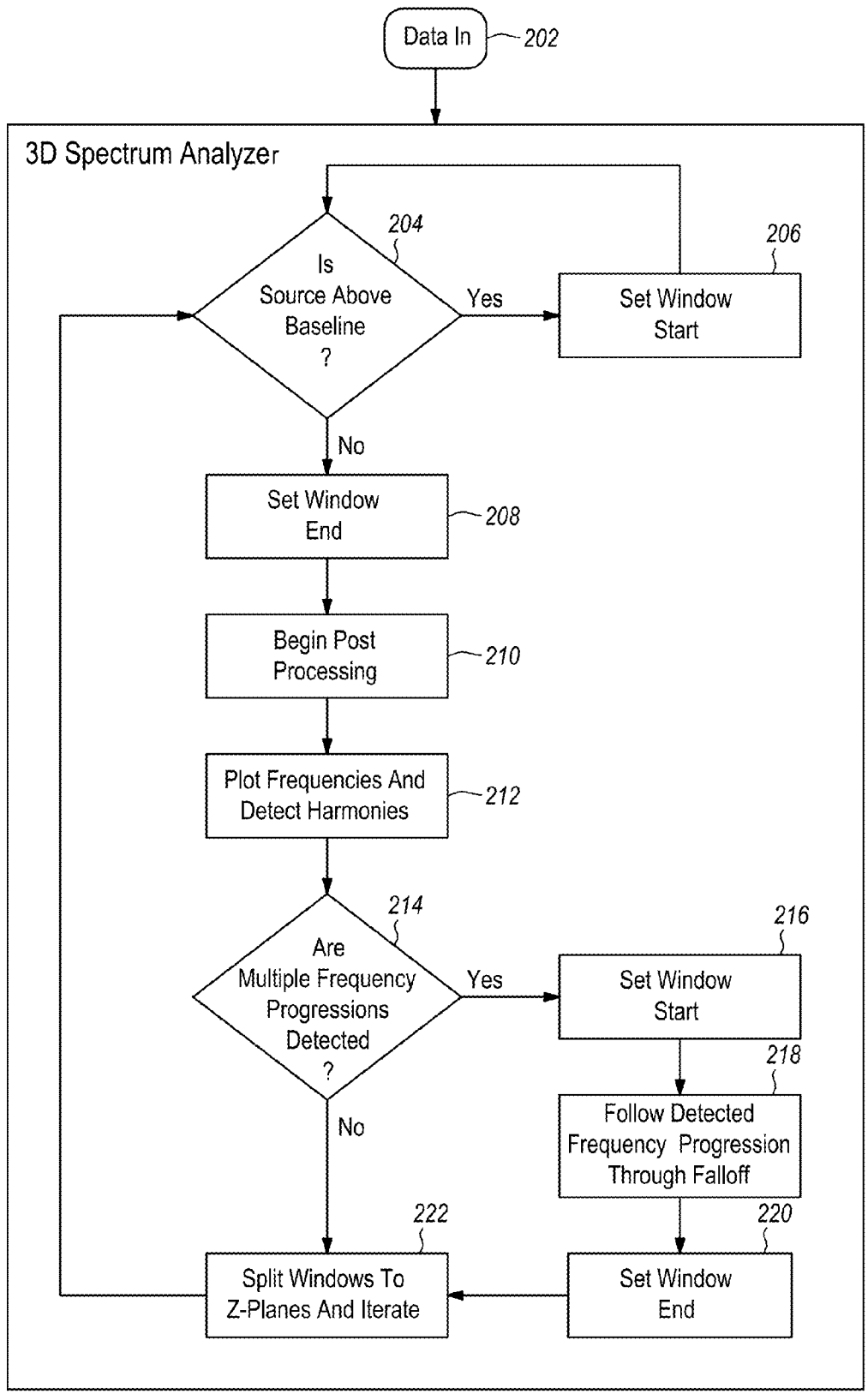
FIGS. 2A-E illustrates an example workflow for particular embodiments of methods for analyzing digital data.

Referring to FIG. 2A, determining a plurality of segments may include an iteration of splitting windows into Z-planes 222. Z-planes may be a third or higher dimension used to augment the two dimensions of time and amplitude included in the original source. (An example of splitting windows into Z-planes is illustrated within FIG. 4.) Splitting windows into Z-planes may comprise determining 204 if a portion of the source is above a baseline. If so, a window start may be set 206. The source sample may then be followed until the source is not above the baseline. At this time the window end may be set 208.

Once a window's beginning and ending are determined, then the method may include post processing 210 which plots frequencies and detects harmonics 212. At this point it may be determined 214 if multiple frequency progressions are detected. If multiple frequency progressions are detected, a new window start may be set 216. The frequency progression is then followed 218 through its falloff. At the point of the frequency progression falloff, an end to the new window may be set 220. This iteration 222 of splitting the source into windows and/or smaller windows may be repeated until each window beginning and ending has been determined and set.

Figure 3:
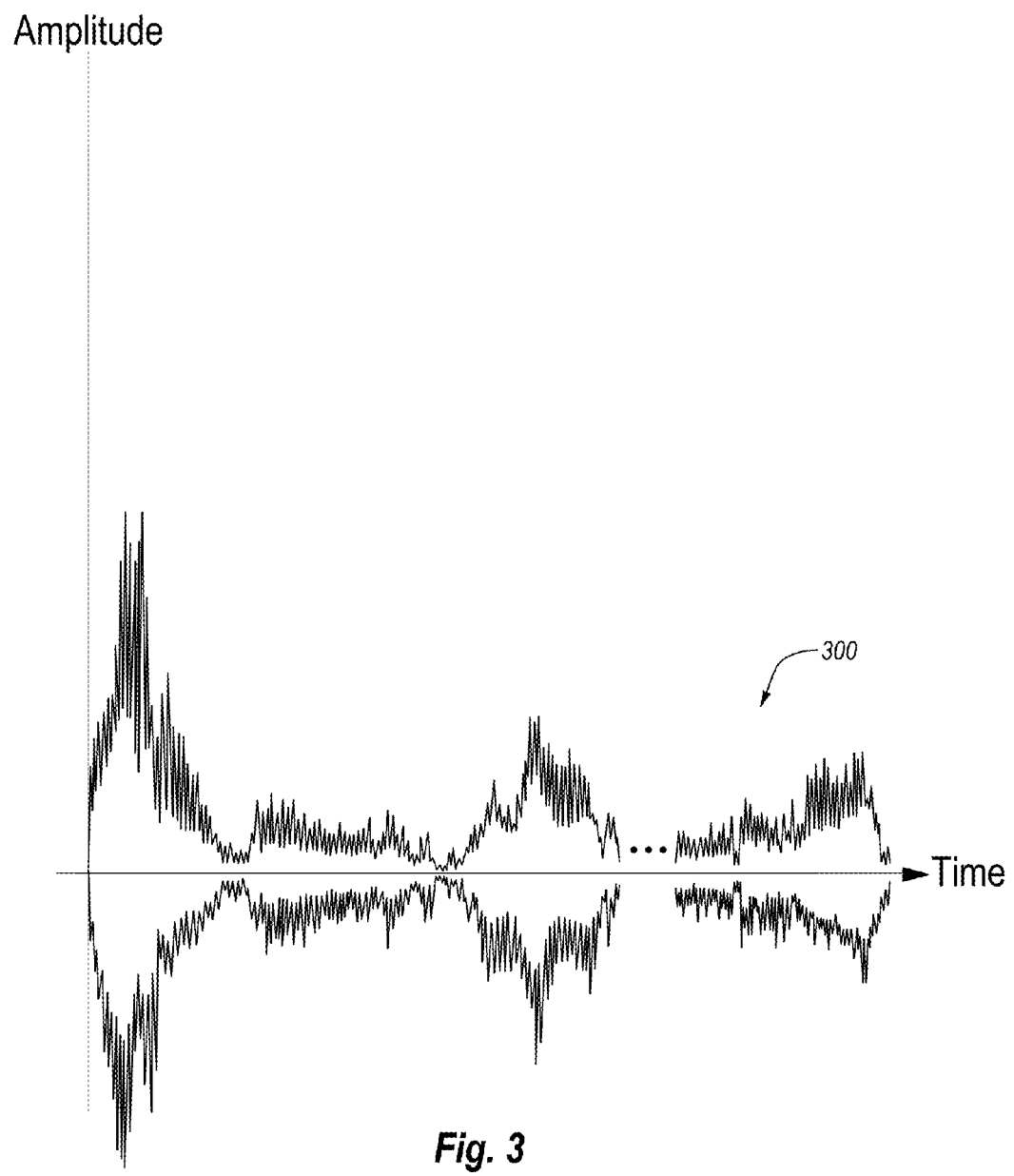
FIG. 3 illustrates an example representation of a digital data file.

Once a source of digital data (e.g., a sound file) is segmented into windows, the source (or file) may be broken into one or more (i.e., n) segments, each of which is marked by a particular beginning time and ending time. FIG. 3 illustrates an example digital audio file. The digital audio is to be segmented into a plurality of discrete windows according to embodiments of the present invention. The representation of the digital audio in FIG. 3 shows amplitude in the vertical axis and time along the horizontal axis. The digital audio 300 depicted in FIG. 3 represents the original (or raw) data. (The digital data depicted in FIG. 3 may also be representative of any source of digital data, not limited to audio data, such as, for example, video data, cardiac function data, etc.)

Figure 4:
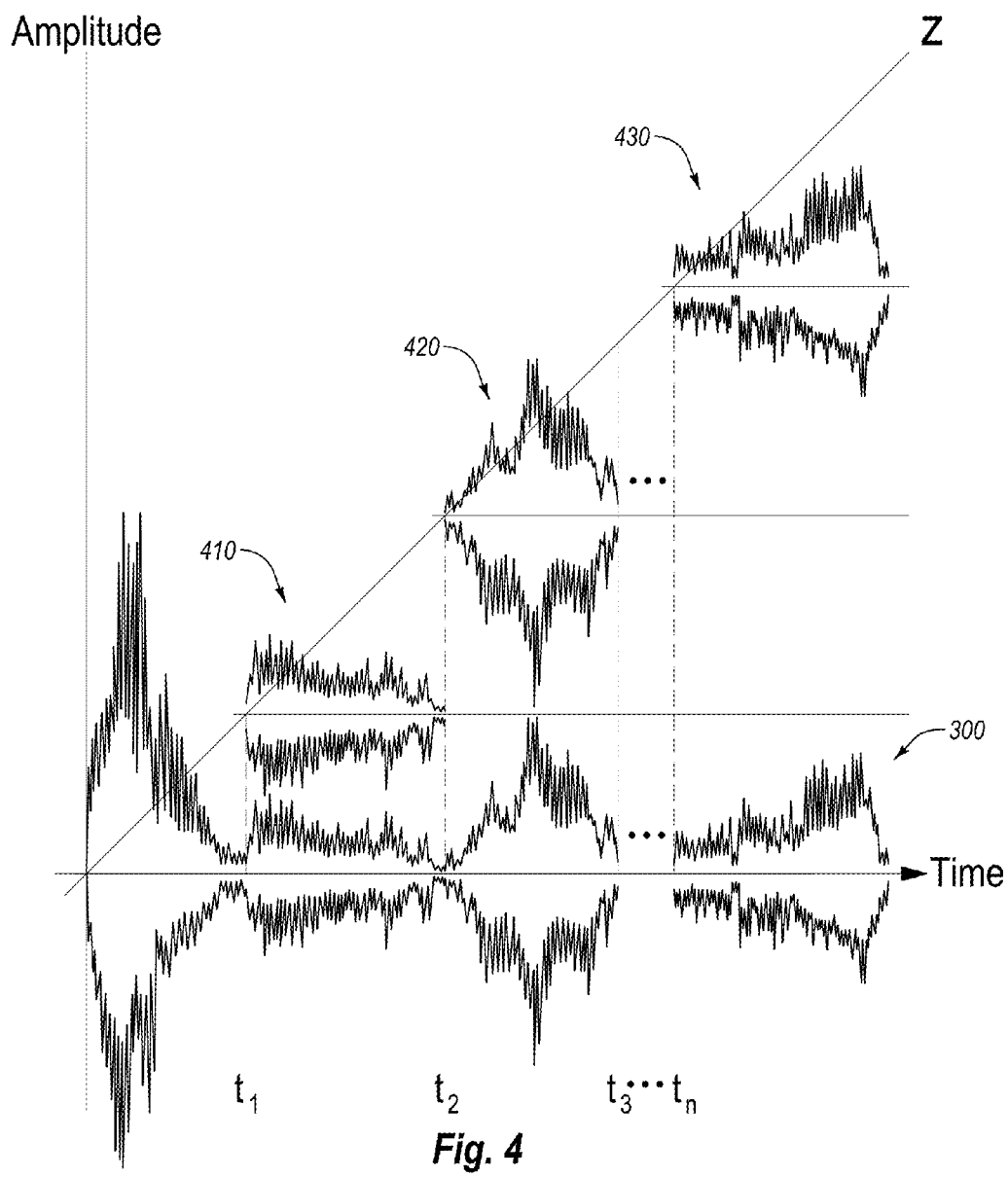
FIG. 4 illustrates an example representation of a digital audio file which has been segmented and represented in an additional dimension.

FIG. 4 represents the same digital data 300 as depicted in FIG. 3. In FIG. 4, the digital data has been determined to be in a plurality of distinct segments delineated by time markers. Each time marker (i.e., $t_i$) in the figure shows the beginning and/or end of a particular window (i.e., segment) within the audio file.

Methods encompassed by embodiments of the present invention may also include separating out and storing or representing each of the segments in an additional dimension, such as a third or possibly a fourth (or higher) dimension. For example, the discrete windows in FIG. 4 delineated by the time markers may be separated out and placed within intermediate buffers or onto a discrete track in the third or possibly a fourth (or higher) dimension. One way of separating out the discrete windows is to place them within different and distinct Z-planes of 2D time-frequency domain data. FIG. 4 illustrates windows from the audio file depicted in FIG. 3 which have been separated out and moved onto discrete Z-planes along the Z-axis depicted in FIG. 4. Each discrete window which has been identified within audio file as depicted in FIG. 3 is separated out and moved onto a discrete Z-plane in the additional dimension depicted in FIG. 4. For example, the window between time $t_1$ and $t_2$ is depicted by the segment 410 on a separate Z-plane. Similarly, the window between time $t_2$ and $t_3$ is depicted by the segment 420 on another separate Z-plane. Similarly, any number of windows may be separated from the original digital data and placed within another Z-plane (as depicted by the ellipsis and window 430).

Figure 6:
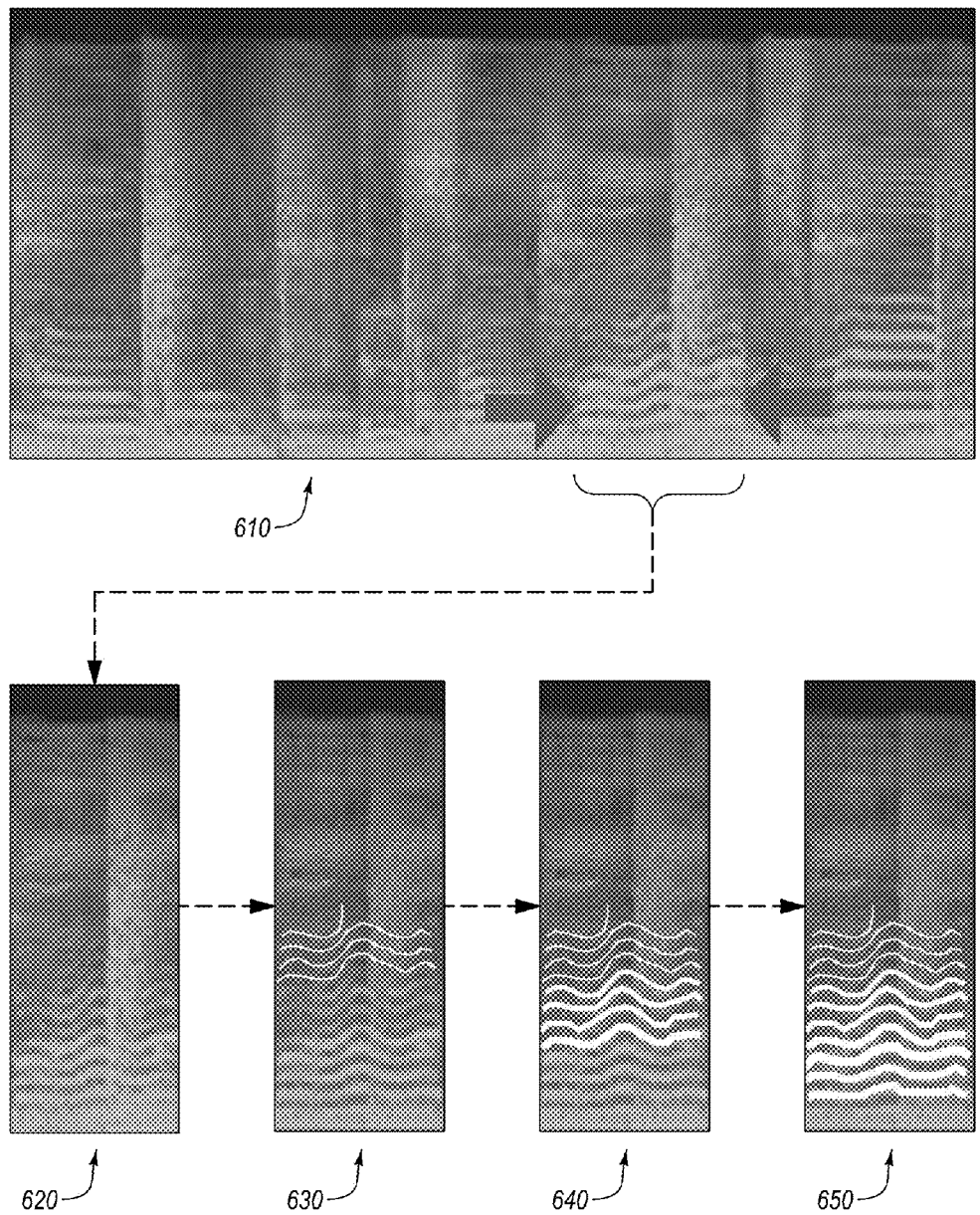
FIG. 6 illustrates an example audio source which has been separated according to embodiments described herein.

FIG. 6 depicts an actual audio source which has been analyzed according to embodiments of the present invention. An original audio source 610 may be visualized as might be represented by the output of an audio spectrum analyzer. The original audio source 610 is depicted with arrows indicating a segment of the audio source identified according to embodiments of the present invention as having similar characteristics that would indicate it may be separated into a distinct window. That segment may be separated (or copied) from the original audio source 610 into a separate window 620.

In turn, the segment in separate window 620 may be analyzed to determine if there are individual characteristics within that segment which may, in turn, warrant additional separation as separate windows. Segments 630, 640, and 650 depict such segments with similar frequency progressions and harmonics of frequency progressions identified by the white line tracings. Each of segments 630, 640, and 650 depict portions of digital data which may be identified from an original data source (or subset of an original data source) as having frequency or harmonic characteristics which may warrant separation into a discrete window (or segment).

It may be noted that the length of a digital data source (e.g., an audio file) and the length of a discrete window identified within a digital data source may vary widely. The length of a data source is dependent upon the underlying data source, itself. The length of a discrete window identified within the data source may vary in size dramatically based upon the length of a particular frequency progression. An audio file which is ten minutes (10 minutes) long may be segmented into windows, each of which is no longer than ten milliseconds (10 ms). The length of discrete windows may, for example, vary between five milliseconds (5 ms) and ten seconds (10 s). However, each ten minute (10 minute) segment may be treated as an audio source and further segmented into sub-segments. The length of each sub-segment may vary and, for example, may typically range between ten milliseconds (10 ms) and ten seconds (10 seconds). Further, the present invention allows that windows may be analyzed in a fashion analogous to how an entire file is analyzed. Accordingly, windows may be analyzed iteratively or recursively in order to break down an audio file into finer and finer sub-windows. This is, as described above, illustrated by the iteration 222 depicted in FIG. 2E. Accordingly, the description herein should be applicable to any scale of digital data source and any scale of segmenting the data source into segments or windows.

When each of the segments or windows (or some subset of the segments) are represented in an additional dimension, a resemblance value for each pair of the segments may be determined. A matrix may be created wherein each pair of windows is represented by a resemblance value indicating the resemblance of the particular pair of windows to each other. FIG. 5 depicts such a matrix of resemblance values for pairs of windows. Each segment number is enumerated along the axes of the matrix and the resemblance values 530 corresponding to each pair of segments is listed in the associated location within the matrix.

For example, segments $\{S_1, S_2, \ldots S_n\}$ are enumerated along the horizontal axis 510 indicated by the integers 1, 2, ... N. Segments $\{S_1, S_2, \ldots S_n\}$ are also enumerated along the vertical axis 520. The resemblance value for two segments, $(S_i, S_j)$, is indicated by the value in the intersection of the tow and column indicated by the relevant segment numbers. For example, the value corresponding to the pair $(S_2, S_6)$, depicted in the intersection of row 2 and column 6 has a value of 97 (item 540). As may be noted, each segment (window) has a resemblance of 100 (on a scale of 0-100) with itself. For example, the value corresponding to the pair $(S_3, S_3)$ has a value of 100. In further examples, segment 1 has resemblance value of 50 with segment 2, a resemblance value of 1 with segment 3, and a resemblance value of 95 with segment 4.

It may be noted that the resemblance values depicted in FIG. 5 range from 0, meaning no resemblance whatsoever, to 100, meaning a pair of windows are identical. However, the resemblance value range is not necessarily 0-100 and is not limited to such a range. The resemblance value range may be chosen in a particular implementation to be any desired range. For example, value ranges such as 0.0-1.0, 0-10, 0-100, 0.00%-100.00%, etc., may be chosen as the range of resemblance values.

In order to determine resemblance values for each pair of windows, a fingerprint of each window may be determined. Such a fingerprint may be determined, for example, by calculating an MD5 checksum of the window data for each window or by calculating an L-Z compression signature of each window data. Of course, as may be appreciated, such a fingerprint for each window may be generated by other means using technology available within the art or by using other, possibly proprietary, technology.

Figure 2B:
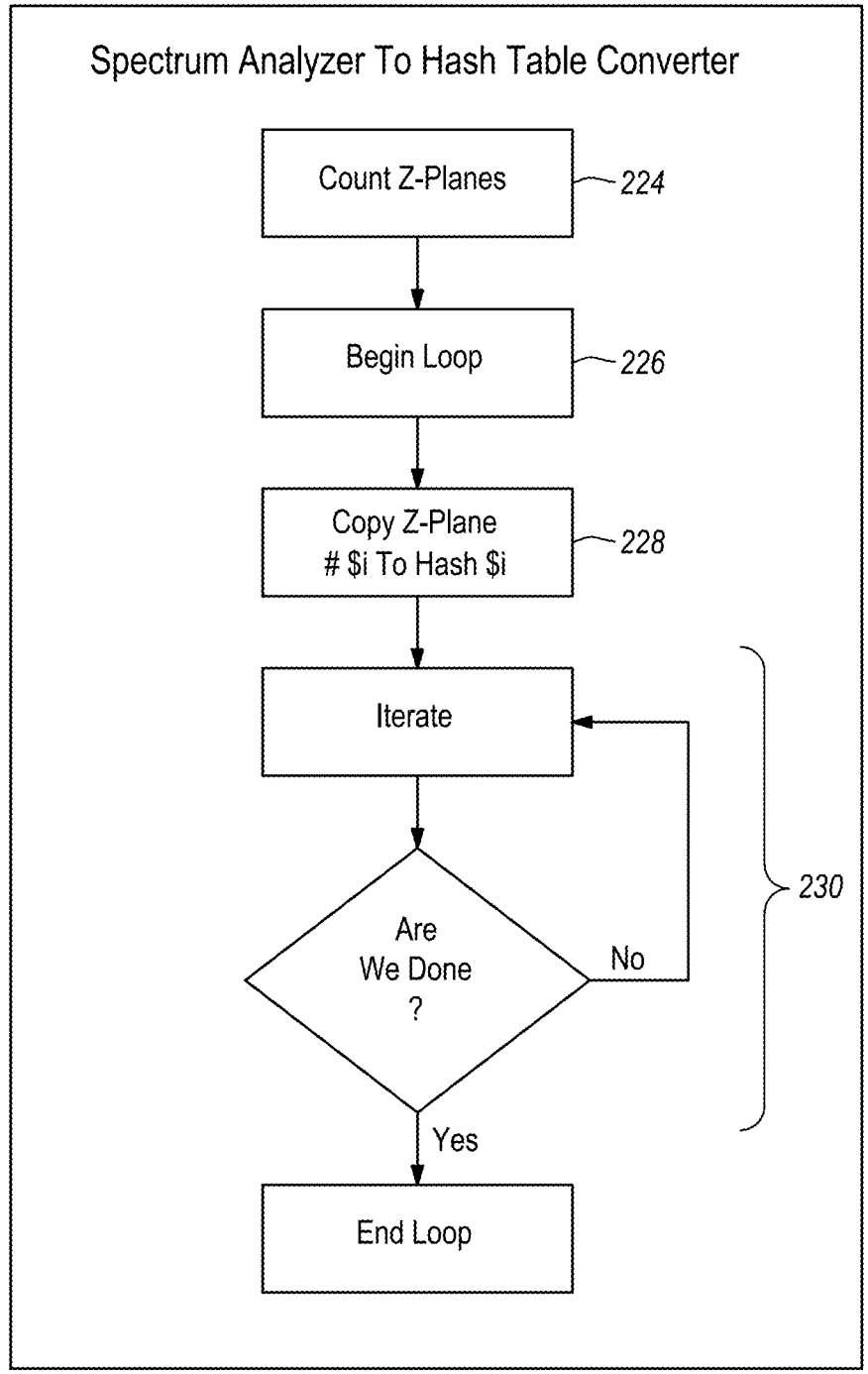

As illustrated in FIG. 2B, in order to create the matrix as depicted in FIG. 5, each of the windows separated out into a Z-plane (or plane of higher dimension) is counted 224. Each Z-plane window is copied 228 to a hash index. All the Z-planes (i.e., all of the separated windows) are iterated through 230 until each has been copied.

Figure 2C:
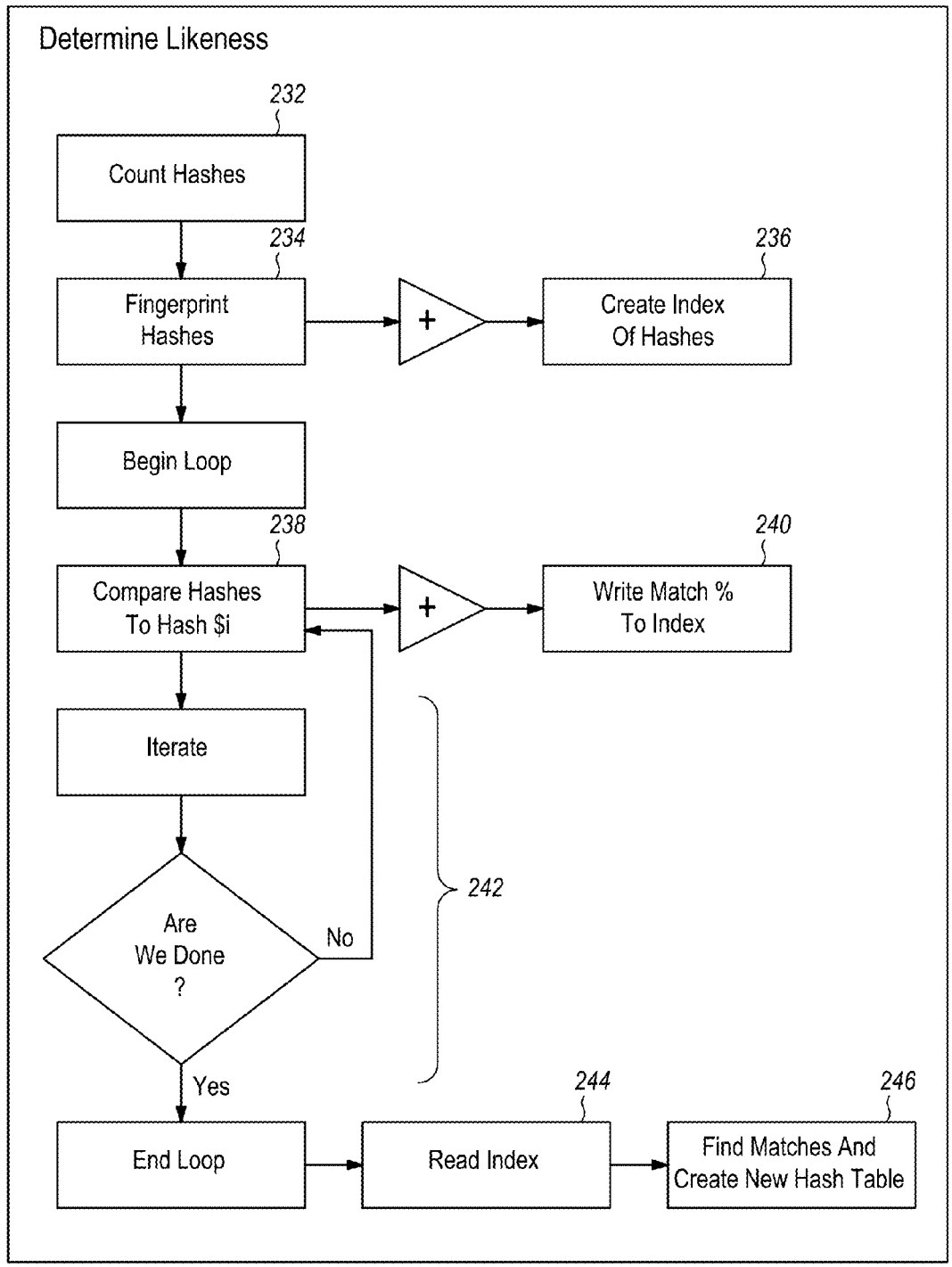

FIG. 2C illustrates additional acts and steps performed in embodiments herein. Each of the hashes created by the copy iteration 230 are counted 232. Each window (Z-plane) hash is then fingerprinted (as discussed herein) and an index of all the fingerprinted hashes is created 236. At this point, the process can iterate 242 through each pair of fingerprinted hashes in order to determine a resemblance value for each pair. Each pair of hashes is compared 238 and the resemblance value may be written 240 to an index. After all pairs have been iterated through and resemblance values determined, the resulting index is read 244 and matches may be found 246 and a new hash table created.

Once a resemblance value is determined for each pair of segments, producing a value of how "like" each pair of segments is to each other, a three-dimensional (3D) fingerprint may be generated for each set of segments which share a resemblance value above some determined threshold. For example, if segments $S_2$, $S_3$, and $S_5$ all had a resemblance value of 0.95 (on a scale from 0.0 to 1.0), then a 3D fingerprint may be calculated for the set of segments $\{S_2, S_3, S_5\}$.

For example, in FIG. 5, segments $S_2$, $S_5$, $S_6$ all have associated resemblance values greater than 95 (on a scale of 0-100). Segments $S_2$ and $S_5$ have a resemblance value of 96. Segments $S_2$ and $S_6$ have a resemblance value of 97. Segments $S_5$ and $S_6$ have a resemblance value of 98. Based on these resemblance values, segments $S_2$, $S_5$, and $S_6$ may be grouped in a set $\{S_2, S_5, S_6\}$ for further processing.

The threshold used to determine the requisite level of similarity between individual segments in order to determine sets of segments may be set by a user or operator or may be determined programmatically within the system based upon available matching values, desired granularity, or other pertinent criteria.

Once the matrix (or table) of resemblance values has been determined and recorded, a method may iterate through the matrix and determine sets of matches wherein each set of matches are the pairs of windows which have a resemblance value equal to or greater than a particular threshold. For example, if the resemblance values range from 0 to 100, the threshold value may be 95 and a set of matches may be a set of pairs, each of which resembles the other pairs in the set with a resemblance value of 95 or greater. As may be appreciated, the threshold value may be set by a user preference or may be determined by an algorithm which calculates an appropriate threshold value for a particular application.

Once a set (or sets) of matches is determined, a 3D fingerprint may then be generated for the matching windows. Such 3D fingerprints may, for example, be calculated using time, frequency, and amplitude of the sounds within the (sound) windows. Each window is iterated through and such 3D fingerprints are generated for all windows which have been separated out into an additional dimension and/or generated or refined from previous fingerprints falling within a likeness threshold. (Of course, while useful for digital sound and often described in terms of a sound file, the embodiments described herein should not be construed to be limited to sound or sound data. The embodiments described herein are applicable to myriad forms of digital data which include, for example, sound, video, cardiac function data, stock market price data, etc.)

Figure 2D:
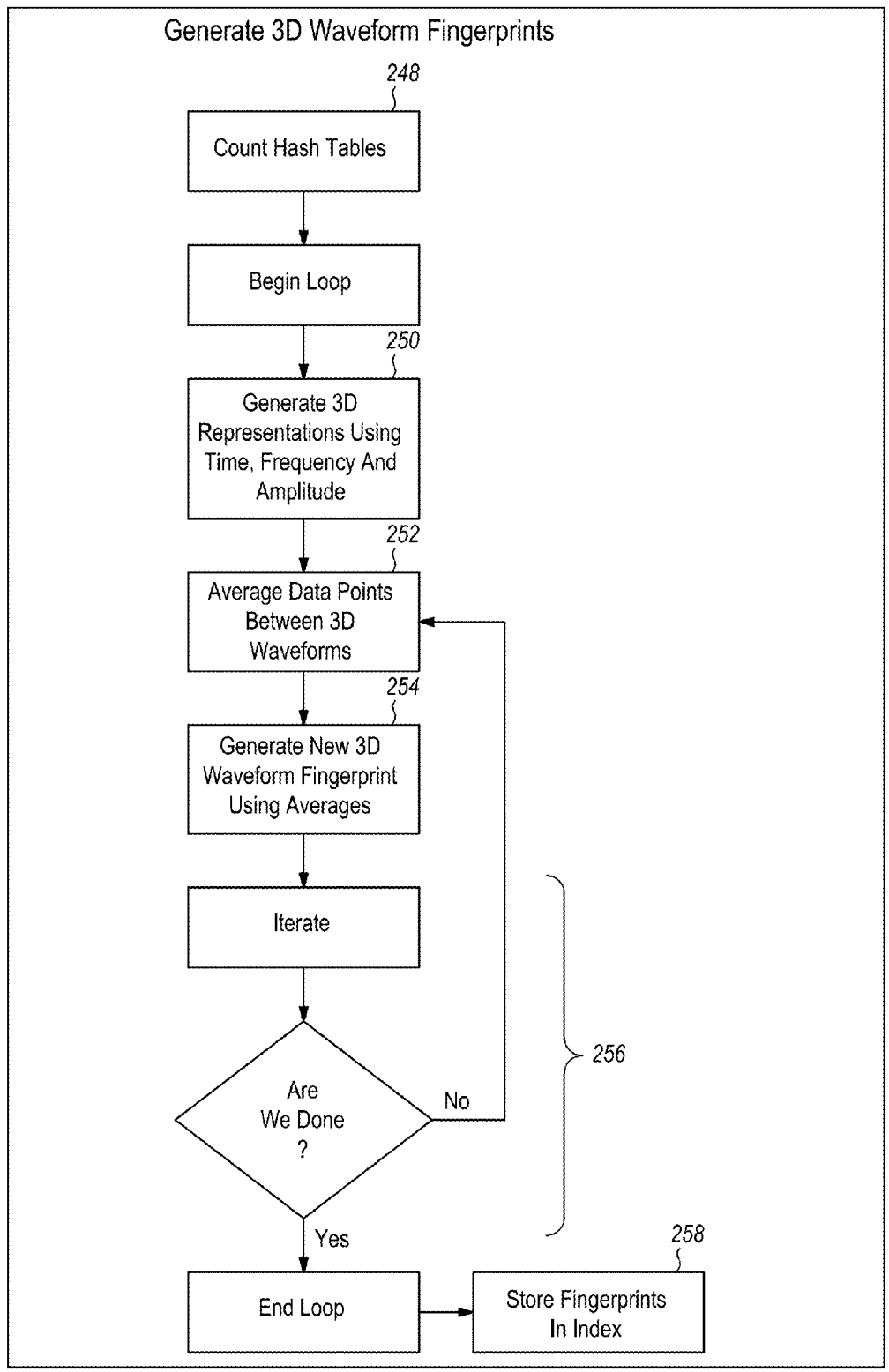

FIG. 2D illustrates example steps and/or acts for generating 3D fingerprints. The hash tables generated earlier may be counted 248. A 3D fingerprint representation may be generated using time, frequency, and amplitude 250.

Once window markers are set (i.e., segments are determined), a preliminary fingerprint may be generated for each detected window to trace out frequency progressions and further refine the detected sample and reduce it down to one window per distinct sample. This process happens via attempting to overlay the tracings of previously detected samples over the new tracing of this distinct sample. An overlay is considered a match when one can be stretched in any of the three axes so that it can properly describe the contents contained within the tracing. If a match cannot be found, the tracings within a detected window are then stored and declared as their own distinct source/sample.

Now an iteration is performed 256 through the hash tables which averages 252 the data points between the 3D waveforms. New 3D waveform fingerprints may then be generated 254 using the computed averages. Each of the newly generated 3D waveform fingerprints may be stored 258 in an index.

Once such 3D fingerprints are generated for each window, overlapping data points within the fingerprints are averaged together to produce an arithmetic mean of the fingerprints. This arithmetic mean can be used to describe the capabilities of this particular source of digital data.

Embodiments of the present invention also extend to methods for filtering digital data. Such filtering methods may be performed within a computer system including one or more processors and data storage. Such filtering methods may include accessing a source of digital data, accessing a fingerprint of one or more segments of the digital data, and filtering the digital data using the accessed fingerprint.

Once the fingerprints are determined in this fashion, it may then be possible to perform bit-mask operations upon the original source of digital data. For example, a bit-mask subtraction may be performed in order to remove all instances of a particular person's voice from an audio track. In another example, a bit-mask AND may be performed during playback in order to only play back the sound of a particular violin (and remove all other sounds and/or voices).

Figure 2E:
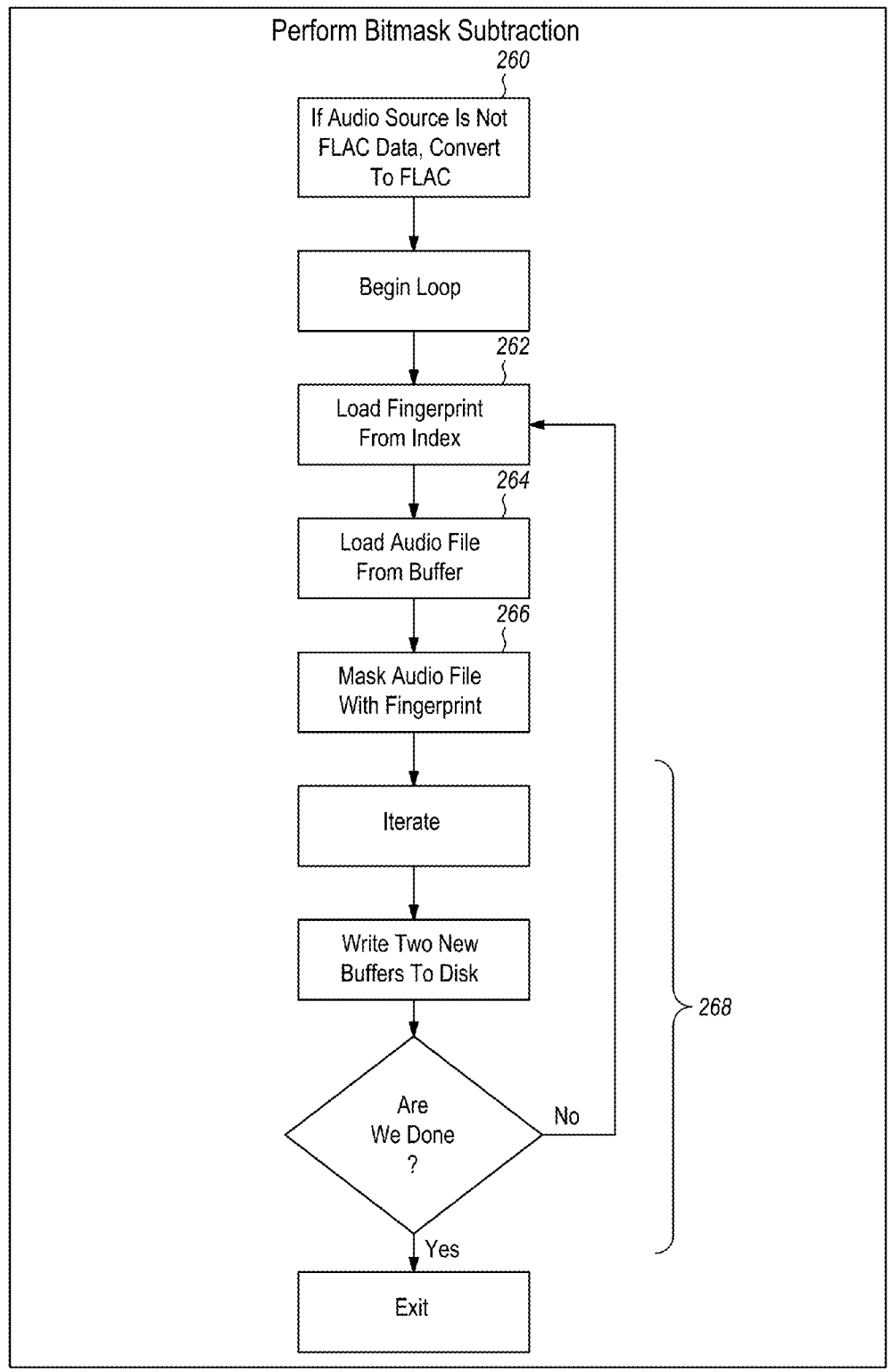

FIG. 2E illustrates an example workflow for performing bitmask subtraction according to embodiments herein. If, for example, the source is an audio source and the audio source is not FLAC data, the source is converted 260 to FLAC. An iteration 268 may now be performed which loads 262 a fingerprint from an index, loads 264 the audio file (or other digital data file) from a buffer, and masks 266 the audio file with the loaded fingerprint. Two buffers may be written to durable storage wherein a first buffer comprises data matching a detected fingerprint and a second buffer comprises data that excludes data which matches the detected fingerprint.

Embodiments of the present invention may also extend to computer program products for analyzing digital data. Such computer program products may be intended for executing computer-executable instructions upon computer processors in order to perform methods for analyzing digital data. Such computer program products may comprise computer-readable media which have computer-executable instructions encoded thereon wherein the computer-executable instructions, when executed upon suitable processors within suitable computer environments, perform methods of analyzing digital data as further described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for analyzing data for determining related portions within the data itself, the method performed by a computer system including one or more processors and data storage, the method comprising:
   accessing data from a source;
   identifying a plurality of segments within the data itself, each segment being identified by a common characteristic;
   comparing each of the plurality of segments to each other of the plurality of segments within the data itself, and determining resemblance values between each of the plurality of segments relative to each other of the plurality of segments;
   storing the resemblance values for each pair of the plurality of segments of the data itself; and
   storing one or more sets of segments, each of the one or more sets of segments including only segments of the data itself having resemblance values above a determined threshold.

2. The method of claim 1 wherein the data comprises archived audio or video data, or real-time streaming audio or video data.

3. The method of claim 1, wherein identifying a plurality of segments within the data includes, for each of the plurality of segments:
   identifying a frequency progression above a baseline, a window of the segment beginning at a deviation from the baseline and ending at a falloff into the baseline.

4. The method of claim 1, wherein comparing each of the plurality of segments to each other of the plurality of segments within the data itself includes:
   detecting segments following similar frequency progressions along lengths thereof; and
   detecting segments which are harmonics.

5. The method of claim 1, wherein a length of each of the plurality of segments is dependent upon a length of the common characteristic as defined by the data itself.

6. The method of claim 1, wherein comparing each of the plurality of segments to each other of the plurality of segments within the data itself, includes:
   determining a fingerprint of each of the plurality of segments.

7. The method of claim 6, wherein comparing each of the plurality of segments to each other of the plurality of segments includes:
   overlaying tracings of frequency progressions, wherein overlaying tracings includes:
      stretching the segments in any of at least three dimensions; and
      determining resemblance values of segments following stretching in any of the at least three dimensions.

8. A computer storage medium storing a computer program product for performing a method for analyzing data and identifying like and not like segments within the data, the computer program product comprising:
   computer storage media; and
   computer executable-instructions stored on the computer storage media, which computer-executable instructions, when executed by a computing system, cause the computing system to perform the method of claim 1.

9. A method for separating samples found within audio data, the method comprising:
   at a computing system, receiving audio data;
   detecting a plurality of windows, wherein detecting the plurality of windows includes:
      identifying a baseline of the audio data; and
      defining a plurality of windows, each of the plurality of windows having a length dependent upon a length of corresponding segment, each segment being a continuous deviation from the baseline within the audio data;
   comparing segments within windows of the audio data to obtain resemblance values between segments; and grouping the segments into one or more sets, each of the one or more sets including only segments of the received audio data having resemblance values above a predetermined threshold.

10. The method recited in claim 9, wherein receiving audio data includes receiving audio data in a first representation, and detecting the plurality of windows includes detecting the plurality of windows using the audio data in a second representation.

11. The method recited in claim 10, wherein:
the first representation includes time-amplitude data; and
the second representation includes time-frequency data.

12. The method recited in claim 9, wherein each continuous deviation follows a frequency progression, the full frequency progression being above the baseline.

13. The method recited in claim 9, wherein comparing segments within windows of the audio data includes:
fingerprinting the segments within windows of the audio data; and
comparing the fingerprints.

14. The method recited in claim 13, wherein comparing segments within windows of the audio data includes:
overlaying fingerprints of different segments;
stretching the fingerprints of the different segments in any of three dimensions; and
determining resemblance values based on stretched fingerprints.

15. The method recited in claim 9, wherein grouping the segments into one or more sets includes grouping the segments into one or more sets each representing a sample within the audio data, each sample including segments likely originating from a same audio source.

16. The method recited in claim 9, wherein each of the one or more sets is a sample, and the method further including:
identifying dominance of each different sample within the audio data.

17. The method recited in claim 16, further comprising:
filtering the audio data based on dominance of the different samples within the audio data.

18. The method recited in claim 9, further comprising:
reassembling a portion of the audio data by outputting only the segments of a single one of the one or more sets, the outputted segments defining a single sample isolated from all other samples of the audio data.

19. The method recited in claim 9, wherein defining a plurality of windows includes:
defining first and second windows corresponding to separate first and second frequency progressions which deviate from the baseline, the second window having start and end times equal to, or fully within, the start and end times of the first window.

20. The method recited in claim 19, wherein the second frequency progression is a harmonic of the first frequency progression.

* * * * *